(12) United States Patent
Chen et al.

(10) Patent No.: US 9,759,976 B2
(45) Date of Patent: Sep. 12, 2017

(54) ELECTROPHORETIC DISPLAY MEDIUM AND PREPARING METHOD THEREOF

(75) Inventors: Yu Chen, Guangdong (CN); Lei Zhang, Guangdong (CN); Zuliang Liu, Guangdong (CN); Xi Zeng, Guangdong (CN); Songli Wei, Guangdong (CN)

(73) Assignee: GUANGZHOU OED TECHNOLOGIES CO., LTD., Guangzhou, Guangdong (CN)

( * ) Notice: Subject to any disclaimer, the term of this patent is extended or adjusted under 35 U.S.C. 154(b) by 425 days.

(21) Appl. No.: 13/508,624

(22) PCT Filed: Dec. 28, 2009

(86) PCT No.: PCT/CN2009/076142
§ 371 (c)(1),
(2), (4) Date: May 8, 2012

(87) PCT Pub. No.: WO2011/057460
PCT Pub. Date: May 19, 2011

(65) Prior Publication Data
US 2012/0229885 A1    Sep. 13, 2012

(30) Foreign Application Priority Data

Nov. 11, 2009 (CN) .......................... 2009 1 0221657

(51) Int. Cl.
*G02B 26/00* (2006.01)
*G02F 1/167* (2006.01)

(52) U.S. Cl.
CPC ...... *G02F 1/167* (2013.01); *G02F 2001/1678* (2013.01)

(58) Field of Classification Search
CPC .. G02F 1/167; G02F 2001/1678; G02F 1/153; G02F 1/13306; G02F 1/1343;
(Continued)

(56) References Cited

U.S. PATENT DOCUMENTS 3,612,578 A    10/1971  Bagnulo
6,577,433 B1 *  6/2003  Lin .................. B82Y 20/00
                                           345/107
(Continued)

FOREIGN PATENT DOCUMENTS

CN    101082752 A    12/2007
CN    101542383 A     9/2009

OTHER PUBLICATIONS

Chinese Office Action, Application No. 200910221657.X, dated Jun. 14, 2011, six (6) pages.
(Continued)

*Primary Examiner* — Scott J Sugarman
*Assistant Examiner* — Sharrief Broome
(74) *Attorney, Agent, or Firm* — Nath, Goldberg & Meyer; Jerald L. Meyer; Tanya E. Harkins

(57) ABSTRACT

An electrophoretic display medium and preparing method thereof. The electrophoretic display medium comprises: negatively or positively-charged pigment particles; neutral pigment particles with colors different from the charged pigment particles; and low-polar and/or non-polar dispersing solvent. The method of preparing the electrophoretic display medium comprises: synthesizing neutral pigment particles; synthesizing charged pigment particles; and preparing electrophoretic display medium. The method of synthesizing the neutral pigment particles comprises: mixing together pigment particles, macromonomers, coupling-agents and chain-initiators for polymeric reaction in the solvent, and reacting at a temperature of 30-120° C. for 4-48 hours. The method is applied to many kinds of inorganic oxides, inorganic salts and complex inorganic salt pigments. This method fundamentally avoids agglomeration caused by attraction of positively and negatively-charged electrophoretic particles, greatly enhancing display performance. The steps of synthesizing particles are simple and the preparing
(Continued)

procedure of the electrophoretic medium is simplified, making the whole process simple and highly efficient.

20 Claims, 3 Drawing Sheets

(58) Field of Classification Search
CPC ...... G02F 1/155; G02F 1/172; G02F 2203/34; G02F 1/0009; G02F 1/0027; G02F 1/0102; G02F 1/0128; G02F 1/0131; G02F 1/03; G02F 1/1309; G02F 1/13338; G02F 1/13
USPC .............. 359/296; 345/107; 430/32, 34, 38; 204/450, 600
See application file for complete search history.

(56) References Cited

U.S. PATENT DOCUMENTS

| | | | | |
|---|---|---|---|---|
| 2006/0089425 A1* | 4/2006 | Chopra | ................... | G02F 1/167 523/206 |
| 2008/0013155 A1* | 1/2008 | Honeyman et al. | .......... | 359/296 |
| 2009/0207477 A1* | 8/2009 | Komatsu et al. | ............. | 359/296 |
| 2009/0268274 A1* | 10/2009 | Masuzawa et al. | .......... | 359/296 |

OTHER PUBLICATIONS

Chinese Office Action, Application No. 200910221657.X, dated Mar. 29, 2012, six (6) pages.

\* cited by examiner ered. The presence of the low polar and/or nonpolar dispersing solvent.

ELECTROPHORETIC DISPLAY MEDIUM AND PREPARING METHOD THEREOF

This is a National Phase Application filed under 35 U.S.C. §371 as a national stage of International Application No. PCT/CN2009/076142, filed Dec. 28, 2009, claiming the benefit from Chinese Patent Application No. 200910221657.X, filed Nov. 11, 2009, the entire content of each of which is hereby incorporated by reference in its entirety.

FIELD OF THE INVENTION

This invention relates to an electrophoretic display medium, and preparing method thereof.

BACKGROUND OF THE INVENTION

Compared with the conventional flat-panel display technique, the electrophoretic display shows low energy consumption, flexibility, high contrast ratio, high image bistability, good visibility and simple application. With the advantage of conventional paper and electron display, the electrophoretic display technique is one of the most promising approaches for current electronic paper applications. Electrophoretic display technique was proposed in the 1970s, which attracted extensive attention gradually. As the core component of electrophoretic display, electrophoretic display medium has direct influences on the effect and performance of electrophoretic display. In 1970, Matsushita Electric Industrial Co. issued a patent U.S. Pat. No. 3,892,568, which disclosed a preparation process of electrophoretic display material which contained at least one type of electrophoretic particles. In 1989, Nippon Mektron Ltd. Issued a patent JP1086116, which disclosed an electrophoretic display system with the encapsulated electrophoretic display medium which contained at least one type of electrophoretic particles. In 1997, E ink Co. issued a patent U.S. Pat. No. 6,120,588, which disclosed a type of electrophoretic display unit composed of encapsulated electrophoretic display medium which contained two types of charged pigment particles. However, this type of electrophoretic display unit has the disadvantages as below:

1. In electrophoretic display medium, the positively charged and negatively charged pigment particles are attracted to each other. As a result, it causes aggregation and sediment of the pigment particles.
2. It involves a complicated surface treatment of the charged pigment particles.
3. The preparation process of the electrophoretic display medium is complicated.

Therefore, these disadvantages lead to low bistability, low chroma, decreased brightness of colors, low contrast ratio, low repeatability of the performance of electrophoretic display medium.

SUMMARY OF THE INVENTION

The purpose of the present invention is to provide a new type of electrophoretic display medium, which could overcome the technical difficulty of traditional electrophoretic display radically and improve the performance of electrophoretic display.

The present invention provides an electrophoretic display medium that comprises: 5 to 30 parts by weight of positively or negatively charged pigment particles; 5 to 30 parts by weight of neutral pigment particles with colors different from the charged pigment particles; and 20 to 70 parts by weight of low polar and/or nonpolar dispersing solvent.

Preferably, the electrophoretic display medium further includes a thickening stabilizer of 0.1-10 parts by weight.

The preferable compositions of the above mentioned electrophoretic display medium are: the dispersing solvents of 40-60 parts by weight; the charged pigment particles of 10-20 parts by weight; the electrically neutral pigment particles of 10-20 parts by weight; the thickening stabilizer of 0.5-5 parts by weight.

The above listed ranges of parts by weight are just some examples to facilitate explaining the electrophoretic display medium. The compositions of the electrophoretic display medium are not necessarily limited in the ranges above, and the compositions could be in wider ranges. In addition, the components of the electrophoretic display medium are not limited in the above examples. Other components could also be included but not limited, a charge control agent such as OLOA11000, a surface tension control agent such as Span80, a wetting dispersant such as organosilicon surfactant, and for example polyether modified trisiloxane and the combination of the above components. The above situation also applies to other listed examples or compositions in the present invention.

The electrophoretic display medium in the present invention could display by just controlling the electrophoretic behavior of one kind of particle. It radically avoids the aggregation caused by the attraction of positively and negatively charged electrophoretic particles, and also improves the performance and repeatability of electrophoretic display and simplifies the reaction process and preparation process significantly. Compared with electrophoretic materials prepared by other methods, this electrophoretic display medium is composed of charged and neutral pigment particles, so that aggregation of particles due to electrostatic attraction could be radically avoided. Because there is no electrostatic attraction between particles, the chemical treatment of charged pigment particles and neutral pigment particles becomes simple, and there is no need of multiple synthetic step so that the preparing procedure is simplified effectively. In the same time, because the interaction force between particles become simple, the preparing process of electrophoretic display medium could be also simplified, thereby addition of extra components is not needed, and complicated preparation process is avoided, by which the efficiency of the preparation of electrophoretic display medium and the repeatability of manufacture is greatly increased, and the cost of materials is greatly reduced.

The said thickening stabilizer could include, but not limited to polymethyl methacrylate, polyethylene, polypropylene, polystyrene, and rubber such as polyisoprene, polyisobutylene or the combinations thereof. Polymethyl methacrylate, polyethylene, polypropylene are preferable.

The pigment of the charged pigment particles and the neutral pigment particles could include, but not limited to titanium dioxide, lithophone, zinc oxide, silica, iron oxide black, carbon black, chromite, chromate, silicate, chrome oxide green, chrome green, copper oxide, titanium yellow, chrome yellow, ferrite yellow, chrome green, manganese violet, iron blue, cobalt blue, zinc white, cadmium yellow, cadmium red, barium sulfate, molybdenum orange, ultramarine, azure blue, imperial green, emerald green and so on.

The surface of the pigment forming the pigment particles could be treated by micron treatment, and the size of the particle is preferably 0.01-5 μm.

The surface of the pigment forming the electrically neutral pigment particles could also be treated by micron treatment, and the size of the particle is preferably 0.1-1 µm.

The treatment could include but not limited to grinding and crushing, ultrasonic dispersion, solvent dispersion and so on. And the relevant apparatus could include but not limited to colloid mill, ball mill, cooling mill, cryogenic crusher, and ultrasound machine and so on.

In addition, the surface of the pigment forming the neutral pigment particles and the charged pigment particles could be treated by physical or chemical methods to increase their stability in solvents. The physical methods mainly include but not limited to physical absorption of polymers, or surfactants at the surface of pigment particles and so on, and the chemical methods mainly include but not limited to modification by silane or polymer grafting on the surface of pigment particles and so on.

The said low polar dispersing solvents could include but not limited to aromatic hydrocarbon such as toluene, benzene, dimethyl benzene, and halogenated hydrocarbon such as chloroform and tetrachloroethylene. Generally, the carbon number of aromatic or halogenated hydrocarbon is less than 30.

The said nonpolar dispersing solvents could include but not limited to linear, branched or cyclic aliphatic hydrocarbon, such as n-hexane, nonane, decane, synthesized isomeric paraffin, synthesized paraffin, synthesized cycloalkane, synthesized alkane, cyclohexane, or halogenated hydrocarbon such as carbon tetrachloride. Generally, the carbon number of aliphatic or halogenated hydrocarbon is less than 30.

The said electrophoretic display medium shows good display performance in the following aspects: the neutral pigment particles are used as a high effective coloring agent to produce background color for electrophoretic display medium, but they are not involved into electrophoresis behavior of particles under the electric field, under the action of which, only charged pigment particles move up and down in the microcapsules. Then combined with the background color produced by the neutral pigment particles, it results in a color change in vision to observers so that the display could be achieved. The key to this invention is that only one type of electrophoretic particles is involved in electrophoretic display, the other type of pigments is used as a coloring agent.

To increase the stability of particles in electrophoretic display medium and improve the display performance, the electrophoretic display medium disclosed in this invention could be encapsulated in microcapsules. The synthesis approaches of microcapsules include but not limited to in-situ polymerization, interfacial polymerization, single or complex coacervation, phase separation, surface deposition and etc. In-situ polymerization is preferable. These approaches are disclosed by Japanese patent 1,086,116 and U.S. Pat. No. 5,057,363. Electrophoretic display medium could also be filled into microcup, micropool or other units with small size which are used in electrophoretic display.

The display situation of the combination of neutral and charged pigment particles under extra electric field is shown in FIG. 1. A common electrode 15 is a transparent electrode. Microcapsule 11 with a diameter of 5.1-150 micrometers is sandwiched between a common electrode 15 and a driving electrode 16. When there is no extra electric field, the black neutral pigment particles 12 and the white negatively charged pigment particles 13 are randomly distributed in the microcapsules. When the driving electrode 16 is positively charged vs. the common electrode 15, the white negatively charged particles 13 moves to the driving electrode 16, the neutral black particles 12 suspend and remain still, so that the common electrode surface appears black color to the observers. While the driving electrode 16 is negatively charged vs. the common electrode 15, the white negatively charged particles 13 moves to the common electrode 15 and the neutral black particles 12 suspend and remain still, so that the common electrode surface appears white color to the observer. Other pigment particles combinations containing neutral pigment particles include: 1. Neutral black particles 12 and positively charged white particles 13; 2. Neutral white particles 13 and negatively or positively charged black particles 12; 3. Neutral colorized particles and another negatively or positively charged particles with a contrast color.

This invention also involves a preparation method of electrophoretic display medium, including the following steps:

1) Preparation of neutral pigment particles;
2) Preparation of positively or negatively charged pigment particles;
3) Preparation of electrophoretic display medium: mixing charged pigment particles of 5-30 parts by weight and solvent of 20-70 parts by weight, supersonically dispersing obtained mixture for 10-60 min to obtain a suspension, preferably 20-30 min; then adding neutral pigment particles of 5-30 parts by weight to the suspension in the state of supersonically dispersed, and then continuing supersonically dispersing for another 10-60 min, preferably 20-30 min, to obtain the electrophoretic display medium. If the dispersing solvent was mixed uniformly, the effect of electrophoretic display medium was better.

Preferably, the process of preparing electrophoretic display medium could further include adding thickening stabilizer of 0.1-10 parts by weight.

The detailed steps of adding thickening stabilizer is as below: mixing charged pigment particles of 5-30 parts by weight with the solvent of 18-60 parts by weight, and supersonically dispersing obtained mixture to obtain a first suspension; then adding neutral pigment particles of 5-30 parts by weight to the suspension in the state of being supersonically dispersed; then continuing supersonically dispersing, to obtain a second suspension, dissolving thickening stabilizer of 0.1-10 parts by weight to the dispersing solvent of 2-10 parts by weight to obtain a solution, then adding this solution to the second suspension to obtain electrophoretic display medium.

Wherein, the preferable compositions of said electrophoretic display medium are: the dispersing solvent of 40-60 parts by weight; the charged pigment particles of 10-20 parts by weight; the neutral pigment particles of 10-20 parts by weight; the thickening stabilizer of 0.5-5 parts by weight.

Wherein, the said synthetic methods of neutral pigment particles include: adding pigment particles, macromonomers, coupling agents, and chain initiators for polymeric reaction into a dispersing solvent and mixing the above together, then reacting at a temperature range of 30-120° C. for 4-48 hours.

The parts by weight of the said reactants of synthesizing the neutral pigment particles are as follows: the dispersing solvents 30-60, the macromonomers 20-35, the pigments 20-35, the coupling agents 0.001-5, the chain initiators for polymeric reaction 0.001-5. Preferably, the dispersing solvents 40-50; the macromonomers 25-30; the pigments 25-30; the coupling agents 0.5-3; the chain initiators for polymeric reaction 0.1-3.

The characteristics of the synthetic method of the said neutral pigment particles are: Relying on surface treatment of the pigment particles such as grafting neutral polymer on the surface of the particles, the electrical neutral property of pigment particles could be ensured. The particles synthesized by this method possess following properties: good dispersing property, high suspension stability, high color coverage rate, with no charge, no aggregation, and no electrostatic attraction with the charged pigment particles to cause the aggregation of the particles. This method applies to many types of inorganic oxides, inorganic salts, or complex inorganic salts pigments.

The said macromonomers could be low polar or nonpolar small molecules which could undergo polymerization reaction, include but not limited to methacrylates, alkenes or dienes such as styrene, butadiene, halogenated alkenes such as vinyl chloride, and their combinations and derivatives. The preferable choice is acrylic esters, methacrylate such as lauryl methacrylate, styrene or their combinations and derivatives.

The said pigments include but not limited to titanium dioxide, lithophone, zinc oxide, silica, iron oxide black, carbon black, chromite, chromate, silicate, chrome oxide green, chrome green, copper oxide, titanium yellow, chrome yellow, ferrite yellow, chrome green, manganese violet, iron blue, cobalt blue, zinc white, cadmium yellow, cadmium red, barium sulfate, molybdenum orange, ultramarine, azure blue, imperial green, or emerald green etc. The size of the particles should be less than 10 μm, preferably 0.01-5 μm, optimally 0.1-1 μm.

The said coupling agents should contain unsaturated group which could undergo polymerization reaction, include but not limited to titanate coupling agent, zirconate coupling agent or aluminate coupling agent etc., preferably titanate coupling agent. The unsaturated groups include double bond, triple bond, or conjugated double bond etc.

The said chain initiators for polymeric reactions include but not limited to azo chain initiators such as azobisisobutyronitrile (AIBN) and azobisisoheptonitrile (ABVN) etc., organic peroxide initiators such as dibenzoyl peroxide (BPO), Lauroyl Peroxide (LPO), dicumyl peroxide, ditertbutyl peroxide, tert-butyl peroxybenzoate, tert-butyl peroxypivalate, diisopropyl peroxydicarbonate, dicyclohexyl peroxydicarbonate, isopropylbenzene hydroperoxide, tert-butyl hydroperoxide or all types of oil soluble oxidation-reduction chain initiators, optimally AIBN, ABVN, BPO, dicumyl peroxide.

The synthetic reaction of neutral pigment particles of the present invention could be carried out at a temperature range of 35-120° C., optimally 70-85° C. The reaction time could be 4-48 hours, optimally 12-16 hours. The reaction could be carried out in the atmosphere or under the protection of inert gas, optimally under the protection of nitrogen or helium. The product could be collected by centrifugal separation, and the rotation speed is generally 2000-5000 rpm, preferably 3500-4000 rpm. Preferably, sediment needs to be rinsed several times by organic solvent such as toluene to obtain neutral pigment particles.

Wherein, the synthesis of charged pigment particles includes: within the temperature range of 30-120° C., in dispersing solvent of 30-60 parts by weight, adding pigment particles of 20-35 parts by weight, macromonomer of 20-35 parts by weight, coupling agent of 0.1-5 parts by weight, and chain initiators for polymeric reaction of 0.001-5 parts by weight and mixing the above together, then under the protection of nitrogen gas, reacting for 12-16 hours.

The said coupling agents of preparing the charged pigment particles are generally silanes, which are apt to form charged particle. The silanes are used to prepare positively charged or negatively charged particles, and the charged behavior of particles is controlled by different functional groups which the silanes carried. The electron withdrawing groups are negatively charged, and electron donating groups are positively charged. For example, the coupling agent with electron withdrawing functional groups such as methacrylate group makes particles negatively charged, while the coupling agent with electron donating functional group such as amino group results in positively charged particles.

The selection of other reactants in the synthesis of the charged particles is almost the same as the synthesis of the neutral particles.

The said dispersing solvent which is used in the preparation of the neutral and the charged particles include various nonpolar and/or low polar organic solvent and their combinations. The low polar solvents include but not limited to various aromatic hydrocarbon such as toluene, benzene, dimethyl benzene, or halogenated hydrocarbon such as chloroform, tetrachloroethylene etc. Nonpolar solvents include but not limited to all kinds of linear, branched and cyclic aliphatic hydrocarbon such as hexane, nonane, decane, synthetic isomeric paraffin (Isopar), synthetic paraffin (Norpar), synthetic cycloalkane (Nappar), synthetic alkane (Varsol/Naphtha), cyclohexane, or halogenated hydrocarbon such as carbon tetrachloride and etc.

The thickening stabilizer which is used to prepare electrophoretic display medium could be nonpolar polymer, include but not limited to polymethyl methacrylate, polyethylene, polypropylene, or rubber such as polyisoprene, polyisobutylene and etc. The optimal choices are polymethyl methacrylate, polyethylene, or polypropylene.

In addition, other components needed to prepare electrophoretic display medium and display device could be added when preparing the electrophoretic display medium. These components include but not limited to charge control agent, surface tension control agent, dispersing wetting agent and their mixtures.

DETAILED DESCRIPTION OF THE INVENTION

Specific examples of the invention are listed as follows. However, the person skilled in the art should understand these examples are used to illustrate the invention in detail, but the protection scope of the invention is not limited to these examples.

Example 1: Synthesis of Neutral Black Particles

Figure 1:
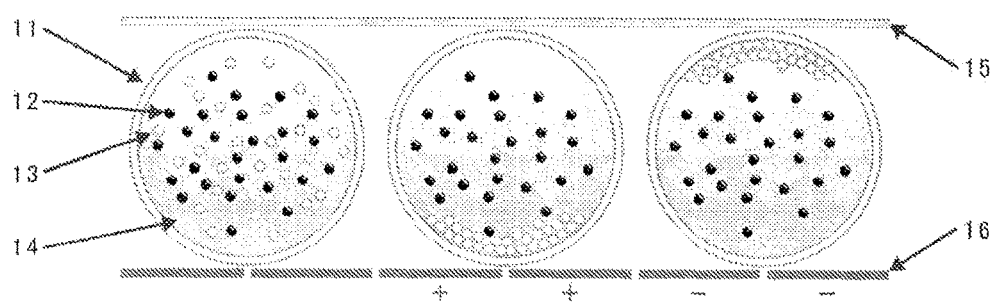
FIG. 1 is a display schematic diagram of neutral and charged pigment particles under extra electrical field.
Figure 2:
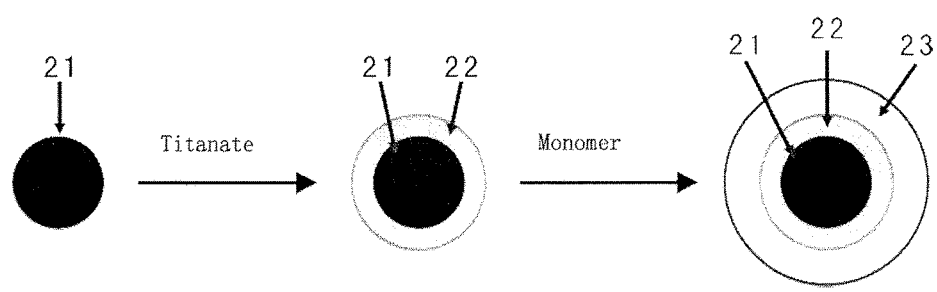
FIG. 2 is a flow diagram for synthesis of neutral black particles provided in the present invention.

In a 1000 ml three-neck flask, 50 g iron oxide black $Fe_3O_4$ pigments (Guocai Pigment Ltd. Co., Guangzhou) was added, then 5 g isopropyl trioleyl titanate with double bond (Shuguang Chemical Ltd. Co., Nanjing), and 50 g lauryl methacrylate, 150 g toluene, 0.5 g AIBN were added. In an inert atmosphere of nitrogen, the mixture was stirring at a speed of 350 rpm for 20 min. In a nitrogen gas atmosphere and with condensation reflux device, the temperature of the reaction mixture was raised slowly to 85° C. and the reaction was lasted for 16 hours. The reaction product was collected through centrifugal separation under 3500 rpm, and was rinsed twice with toluene. As shown in FIG. 2, through the chemical reaction provided in the present invention, the titanate could be grafted on the surface of pigment particles 21 through coupling reaction to form a thin titanate hydrolytic product thin film 22. At the same time, the polymer chains 23, which was produced in the solution, was grafted on the particle surface through reacting with double bond of the titanate molecule.

Example 2: Synthesis of Neutral Black Pigment Particles

In a 1000 ml three neck flask, 40 g iron oxide black $Fe_3O_4$ pigments (Guocai Pigment Chemical Industry Ltd., Guangzhou) was added, then 4 g isopropyl trioleyl titanate with double bond (Shuguang Chemical Group Ltd., Nanjing), and 20 g methyl methacrylate, 20 g styrene, 100 g toluene, 0.1 g AIBN were added. In an inert atmosphere of nitrogen, the mixture was mixed by stirring at a rotation speed of 350 rpm for 20 min. In a nitrogen gas atmosphere and with condensation reflux device, the temperature of reaction mixture was raised slowly to 85° C., and the reaction was lasted for 16 hours. The reaction product was collected through centrifugal separation under 3500 rpm, and was rinsed twice with toluene. As shown in FIG. 2, through the chemical reaction provided in the present invention, the titanate could be grafted on the surface of pigment particles 21 through coupling reaction to form a thin titanate hydrolytic product thin film 22. At the same time, the polymer chains 23, which was produced in the solution, was grafted on the particle surface through reacting with double bond of the titanate molecule.

Example 3: Synthesis of Neutral White Pigment Particles

In a 1000 ml three neck flask, 50 g titania R101 (Dupont USA) was added, then 3 g titanate KR7 (Kenrich Petrochemicals Inc.), and 50 g lauryl methacrylate, 150 g toluene, 0.3 g AIBN were added. In an inert atmosphere of nitrogen, the mixture was mixed by stirring at a rotation speed of 350 rpm for 20 minutes. In a nitrogen gas atmosphere and with condensation reflux device, the temperature of reaction mixture was raised slowly to 85° C., and the reaction was lasted for 16 hours. The reaction product was collected through centrifugal separation under 3500 rpm, and was rinsed twice with toluene. As shown in FIG. 2, through the chemical reaction provided in the present invention, the titanate could be grafted on the surface of pigment particles 21 through coupling reaction to form a thin titanate hydrolytic product thin film 22. At the same time, the polymer chains 23, which was produced in the solution, was grafted on the surface of the particles through reacting with double bond of the titanate molecule.

In order to compare the suspension stability of neutral black and white particles which was treated by surface polymer modification in dispersing solvent, the solid suspensions with same ratio were prepared with the products of the above examples 1, 2, 3 and unmodified iron black and titania pigments, and then settling velocity of the solid particles were measured respectively. The specific compositions of the solid suspensions are as follows: 5.0 g pigment particles (weight percentage 25 w %), 14.5 g tetrachloroethylene (weight percentage 74.75 w %), 0.5 g 10% polystyrene solution in cyclohexane (weight percentage 0.25 w %). In a 20 ml glass sample vial, the prepared suspension has an initial height of 4.5 cm. After shaking well the mixture, how long it takes the interface between the turbid solid suspension and the upper clear solution to settle for about 1 cm was measured, and was shown in table 1. It could be seen from the data of table 1, that the stability of iron oxide black pigments was improved after surface polymer modification, comparing with the unmodified iron oxide black particles.

TABLE 1 comparison of the stability and average settling velocity of pigment particles

| Pigment | Settling time (min) | Average particle size (μm) | Average settling velocity (cm/h) |
|---|---|---|---|
| Example 1 | 1420 | 0.20 | 4.23*10$^{-2}$ |
| Unmodified $Fe_3O_4$ iron oxide black | 45 | 0.20 | 1.33 |
| Example 2 | 1300 | 0.20 | 4.62*10$^{-2}$ |
| Unmodified $Fe_3O_4$ iron oxide black | 45 | 0.20 | 1.33 |
| Example 3 | 1180 | 0.29 | 5.08*10$^{-2}$ |
| Unmodified titania | 40 | 0.29 | 1.5 |

Example 4: Synthesis of White Negatively Charged Pigment Particles

Figure 3:
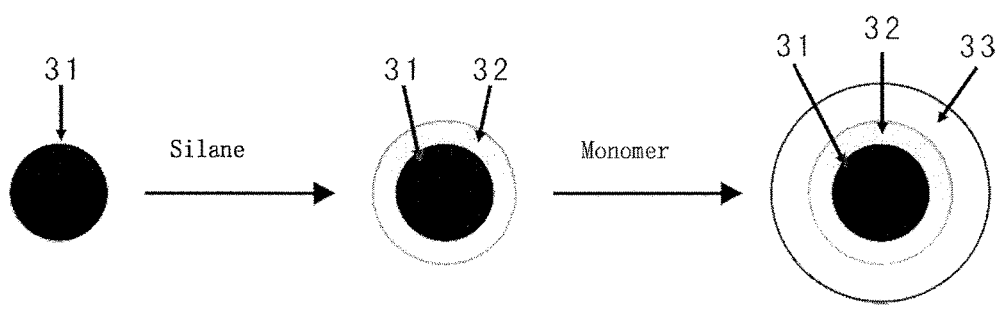
FIG. 3 is a flow diagram for synthesis of charged white particles provided in the present invention.

In a 1000 ml three neck flask, 50 g titania R706 (Dupont Inc. USA) was added, then 2.0 g silane Z6030 with methylpropenoic acid functional group (Dow Corning Inc. USA), and 50 g lauryl methacrylate (Aldrich, USA), 100 g toluene, 0.5 g AIBN were added. In an inert atmosphere of nitrogen, the mixture was mixed by stirring at a rotation speed of 350 rpm for 20 minutes. In a nitrogen gas atmosphere and with condensation reflux device, the temperature of reaction mixture was raised slowly to 85° C., and the reaction was lasted for 16 hours. The reaction product was collected through centrifugal separation under 3500 rpm, and was rinsed twice with toluene. As shown in FIG. 3, through the chemical reaction provided in the present invention, the silane could be grafted on the surface of pigment particles 31 through coupling reaction to form a thin silane hydrolytic product thin film 32 (organic silane obtained from hydrolysis and its crosslinking products). At the same time, the polymer chains 33, which was produced in the solution, was grafted on the surface of the pigment particle through reacting with double bond of the coupling agent molecule.

Example 5: Synthesis of Positively Charged Black Particles

In a 1000 ml three neck flask, 50 g iron oxide black $Fe_3O_4$ (Guocai Pigment Ltd. Co., Guangzhou) was added, then 2.0 g silane Z6032 with amino functional group (Dow Corning Inc. USA), and 50 g lauryl methacrylate (Aldrich, USA), 100 g toluene, 0.5 g AIBN were added. In an inert atmosphere of nitrogen, the mixture was mixed by stirring at a rotation speed of 350 rpm for 20 minutes. In a nitrogen gas atmosphere and with condensation reflux device, the temperature of reaction mixture was raised slowly to 85° C., and the reaction was lasted for 16 hours. The reaction product was collected through centrifugal separation under 3500 rpm, and was rinsed twice with toluene. As shown in FIG. 3, through the chemical reaction provided in the present invention, the silane could be grafted on the surface of pigment particles 31 through coupling reaction to form a thin silane hydrolytic product thin film 32 (organic silane obtained from hydrolysis and its crosslinking products). At the same time, the polymer chains 33, which was produced in the solution, was grafted on the surface of the pigment particle through reacting with double bond of the coupling agent molecule.

Example 6: Preparation of Electrophoretic Display Medium 25 g product obtained from example 4 was added to 65 g tetrachloroethylene, and the mixture was supersonically dispersed for 30 minutes to obtain a suspension A. Then 6 g product obtained from example 1 was added into the suspension A in the state of being supersonically dispersed, and the mixture was continued being supersonically dispersed for 30 minutes. At the end, 2.4 g 10% polystyrene solution in cyclohexane was weighed and added to the above suspension, and the mixture was mixed uniformly to get electrophoretic display medium.

Example 7: Preparation of Electrophoretic Display Medium 25 g product obtained from example 4 was added to 65 g tetrachloroethylene, and the mixture was supersonically dispersed for 30 minutes to obtain a suspension B. Then 6 g product obtained from example 2 was added into the suspension B in the state of being supersonically dispersed, and the mixture was continued supersonically dispersing for another 30 minutes. At the end, 5 g 5% polymethyl methacrylate solution in chloroform, 1 g 10% OLOA11000 solution in tetrachloroethylene, 1 g 10% Span80 solution in tetrachloroethylene were weighed and added, and then the mixture was mixed uniformly to obtain an electrophoretic display medium.

Example 8: Preparation of Electrophoretic Display Medium 6 g product obtained from example 5 was added to 62 g tetrachloroethylene, and the mixture was supersonically dispersed for 30 minutes to obtain a suspension C. Then 28 g product obtained from example 3 was added into the suspension C in the state of being supersonically dispersed, and the mixture was continued being supersonically dispersed for another 30 minutes. At the end, 4 g 5% polymethyl methacrylate solution in chloroform, 0.1 g polyether modified trisiloxane, 1 g 10% Span80 solution in tetrachloroethylene were weighed and added to the above suspension, and then the mixture was mixed uniformly to obtain an electrophoretic display medium.

Example 9: Effect of Electrophoretic Display

According to the approaches disclosed by Japan patent 1,086,116 and U.S. Pat. No. 5,057,363, microspheres for display was made from the electrophoretic display medium prepared in examples 6, 7, 8. The preparing approaches include: in-situ polymerization, interfacial polymerization, single/complex coacervation, phase separation, or surface deposition etc., optimally in-situ polymerization. The detailed steps were as follows: The microspheres for display was dispersed in aqueous adhesive to get display coating liquid which then was coated by coating instrument to get a accurate coating or printing so as to produce a display layer with multiple heat-cured layers which were arrayed tightly. Then, the above display material layer was hot-pressed on an ITO conductive layer to obtain a display device. In the end, the black-white reflective index and contrast ratio of the electrophoretic display film driven by electricity was measured by spectrophotometer. It could be seen from table 2, that the display film samples 1", 2", 3" have high contrast ratio (>7) and high white reflective index (>40%).

The steps of the in-situ polymerization is detailed as below: 240 g urea and 455 g formaldehyde solution (37%) were weighed and added to a 2000 ml beaker, the mixture was mixed then stirred rapidly. Triethanolamine was added into the mixture until the pH value reached 8.0. Then the mixture was heated to 70° C. and reacted at 70° C. for 1 h to obtain a viscous liquid. Then 1000 ml water was added to dilute the product and obtain an ureaformaldehyde prepolymer solution The electrophoretic display medium in examples 6, 7, 8 were added to the ureaformaldehyde prepolymer solution and the stirring rate was raised properly, and the mixture was stirred until the average diameter of microcapsule reaches about 75 μm. Then hydrochloric acid (10%) was added until pH reached 4.0. After six hours' reaction, the reaction mixture was cooled down to the room temperature, and the reaction products were collected in a 3 L plastic cup.

TABLE 2

The test results of black-white reflective index and contrast ratio of electrophoretic display film

| Display membrane | L*wihte | L*black | R white | R black | Contrast ratio |
|---|---|---|---|---|---|
| Sample 1# | 70.69 | 26.63 | 41.74 | 4.96 | 8.41 |
| Sample 2# | 69.92 | 27.24 | 40.64 | 5.18 | 7.84 |
| Sample 3# | 70.48 | 26.71 | 41.43 | 4.99 | 8.30 |

Explanation: 1. L* value stands for the reflective light intensity of the display film, the higher the L* value, the higher the reflective index.
2. Rvalue stands for the reflective index, R = ((L*+16)/116)$^3$*100%.
3. Contrast = R white/R black

What is claimed is:

1. An electrophoretic display medium comprising:
   10 to 20 parts by weight of charged pigment particles, wherein the charged pigment particles consist of either only positively charged particles or only negatively charged particles;
   10 to 20 parts by weight of neutral pigment particles with colours different from those of the charged pigment particles;
   40 to 60 parts by weight of low polar and/or nonpolar dispersing solvents; and 0.5 to 5 parts by weight of thickening stabilizers,
   wherein the surfaces of the neutral particles and the charged pigment particles are all treated by either a physical method or chemical method; the physical method is physical absorption of polymers and/or surfactants at the surfaces of pigment particles, and the chemical method is polymer grafting on the surfaces of pigment particles;
   wherein the size of pigments forming the charged pigment particles is 0.1-1 μm;

wherein the size of pigments forming the neutral pigment particles is 0.1-1 μm.

2. The electrophoretic display medium according to claim 1, characterized in that said thickening stabilizer are selected from polymethyl methacrylate, polyethylene, polypropylene, polyisobutylene, polyisoprene or the mixture thereof.

3. The electrophoretic display medium according to claim 1, characterized in that the electrophoretic display medium is encapsulated in microcapsule.

4. The electrophoretic display medium according to claim 3, characterized in that the preparation methods of said microcapsule include in-situ polymerization, interfacial polymerization, single or complex coacervation, phase separation or surface deposition microcapsule technology.

5. The electrophoretic display medium according to claim 1, characterized in that the electrophoretic display medium is filled into small size container for electrophoretic display.

6. The electrophoretic display medium according to claim 1, characterized in that the electrophoretic display medium is filled into microcup or microcell for electrophoretic display.

7. The electrophoretic display medium according to claim 1, characterized in that the neutral and the charged pigment particles are titanium dioxide, lithophone, zinc oxide, silica, iron oxide black, carbon black, chromite, chromate, silicate, chrome oxide green, chrome green, copper oxide, titanium yellow, chrome yellow, ferrite yellow, chrome green, manganese violet, iron blue, cobalt blue, zinc white, cadmium yellow, cadmium red, barium sulfate, molybdenum orange, ultramarine, azure blue, imperial green, or emerald green and so on.

8. The electrophoretic display medium according to claim 1, characterized in that the low polar dispersing solvent is aromatic hydrocarbon or halogenated hydrocarbon.

9. The electrophoretic display medium according to claim 1, characterized in that the aromatic hydrocarbon as low polar dispersing solvents are toluene, benzene, or dimethyl benzene.

10. The electrophoretic display medium according to claim 8, characterized in that the halogenated hydrocarbon as low polar dispersing solvent is chloroform or tetrachloroethylene.

11. The electrophoretic display medium according to claim 1, characterized in that the nonpolar dispersing solvents are linear, branched and cyclic aliphatic or halogenated hydrocarbon.

12. The electrophoretic display medium according to claim 11, characterized in that the aliphatic hydrocarbon as nonpolar dispersing solvent includes n-hexane, nonane, decane, synthesized isomeric paraffin, synthesized paraffin, synthesized cycloalkane, synthesized alkane, or cyclohexane.

13. The electrophoretic display medium according to claim 11, characterized in that the halogenated hydrocarbon as nonpolar dispersing solvent is carbon tetrachloride.

14. The electrophoretic display medium according to claim 1, characterized in that the electrophoretic display medium further includes charge control agent, surface tension control agent, dispersion wetting agent and/or their combination.

15. A method of preparing an electrophoretic display medium according to claim 1, comprising:
  1) preparing neutral pigment particles;
  2) preparing positively or negatively charged pigment particles;
  3) preparing electrophoretic display medium: mixing the charged pigment particles of 5-30 parts by weight with dispersing solvent of 20-70 parts by weight, and supersonically dispersing obtained mixture to obtain a suspension; then adding the neutral pigment particles of 5-30 parts by weight to the suspension in the state of being supersonically dispersed, continuing supersonically dispersing to obtain electrophoretic display medium.

16. The method according to claim 15, characterized in that the step 3) also includes: adding thickening stabilizer of 0.1-10 parts by weight to the electrophoretic display medium.

17. The method according to claim 16, characterized in that the detailed steps of adding thickening stabilizer are as follows: mixing charged pigment particles of 5-30 parts by weight with a dispersing solvent of 18-60 parts by weight, and supersonically dispersing obtained mixture to obtain a suspension; then adding electrically neutral pigment particles of 5-30 parts by weight to the suspension in the state of being supersonically dispersed, and continuing supersonically dispersing; dissolving thickening stabilizer of 0.1-10 parts by weight into a dispersing solvent of 2-10 parts by weight to form a solution, then adding the solution to the above suspension to obtain electrophoretic display medium.

18. The method according to claim 15, characterized in that the step 1), i.e., preparing neutral particles includes:
  mixing together pigment particles, macromonomers, coupling agents and chain initiators for polymeric reaction in a dispersing solvent, reacting for 4-48 hours at a temperature range of 30-120° C.;
  wherein parts by weight of the reactants for preparing the neutral pigment particles are respectively: dispersing solvents 30-60, macromonomers 20-35, pigments 20-35, coupling agents 0.1-5, chain initiators for polymeric reaction 0.001-5.

19. The method according to claim 18, characterized in that the parts by weight in the method of preparing neutral pigments particles, parts by weight of the reactants are respectively as follows: dispersing solvents 40-50; macromonomers 25-30; pigments 25-30; coupling agents 0.5-3; chain initiators for polymeric reaction 0.1-3.

20. The method according to claim 18, characterized in that the coupling agents are titanate coupling agents, zirconate coupling agents or aluminate coupling agents.

* * * * *